Oct. 8, 1935.  E. G. SEASTROM  2,017,018
EDGE CURLING DEVICE
Filed Oct. 23, 1934   3 Sheets-Sheet 1
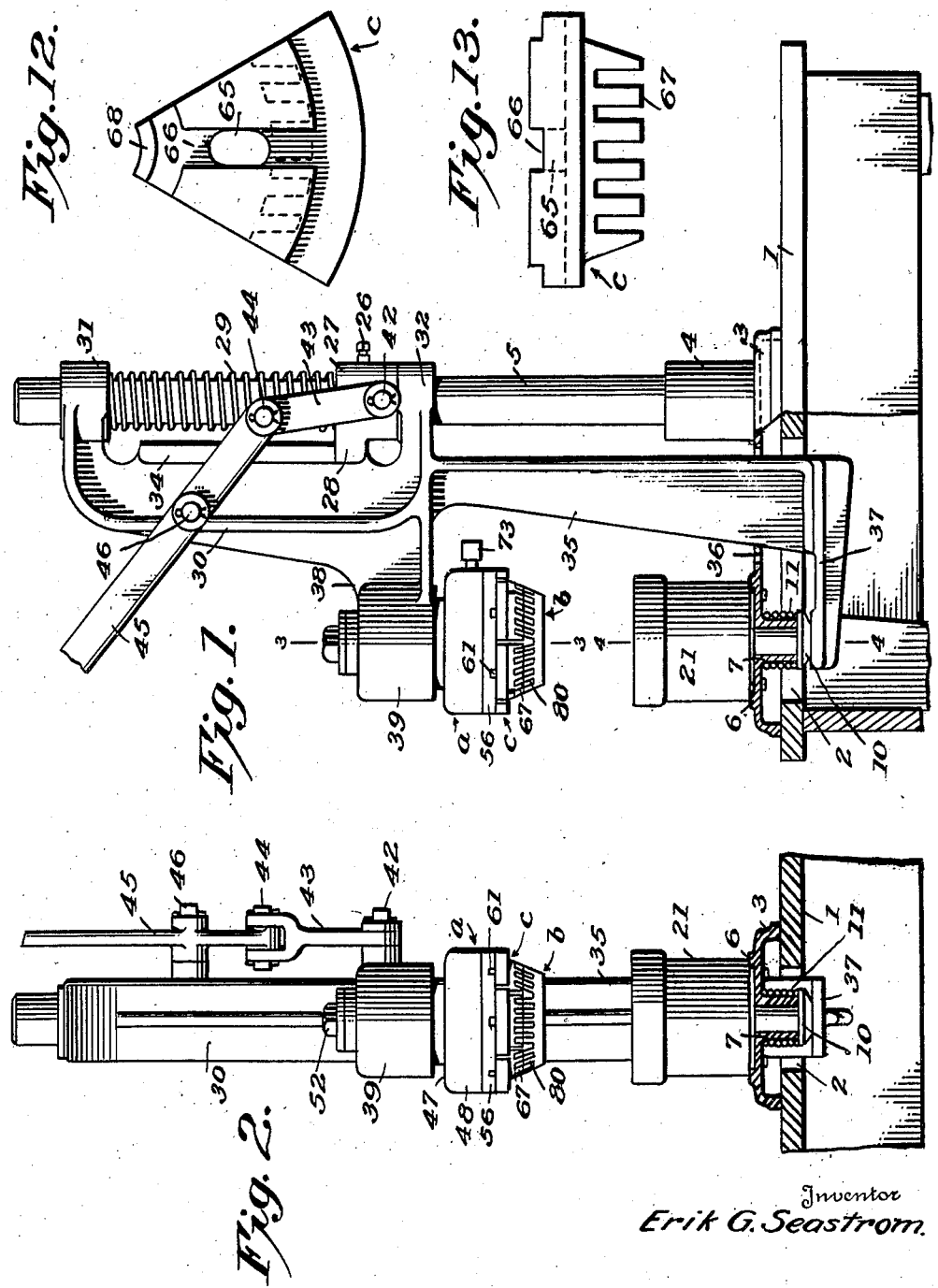
Inventor
Erik G. Seastrom.
By Milans & Milans
Attorneys Oct. 8, 1935. E. G. SEASTROM 2,017,018
EDGE CURLING DEVICE
Filed Oct. 23, 1934 3 Sheets-Sheet 2
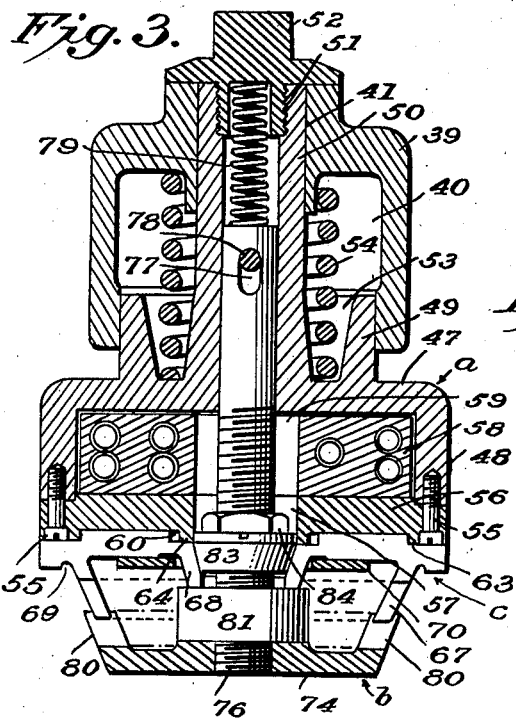
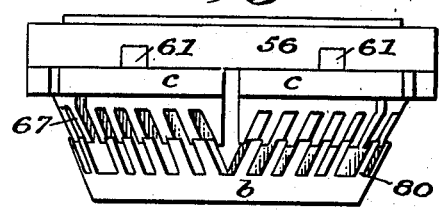
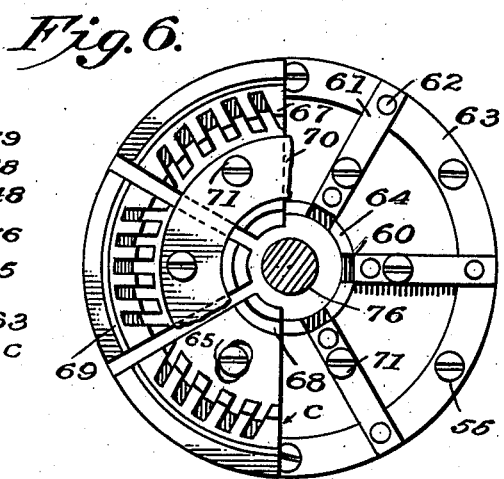
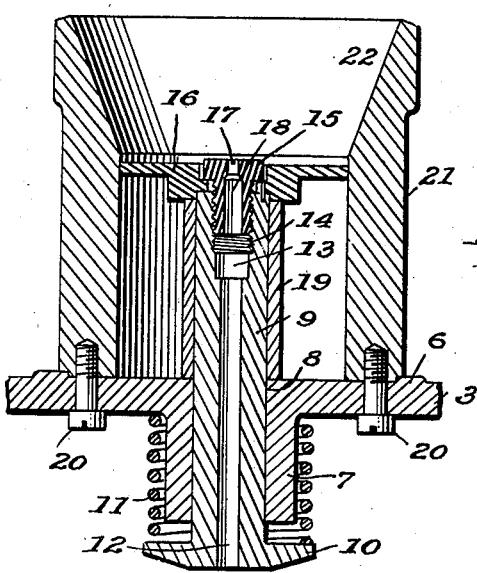
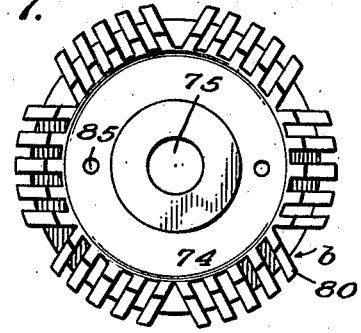
Inventor
Erik G. Seastrom.
By Milans & Milans
Attorneys Oct. 8, 1935.  E. G. SEASTROM  2,017,018
EDGE CURLING DEVICE
Filed Oct. 23, 1934  3 Sheets-Sheet 3
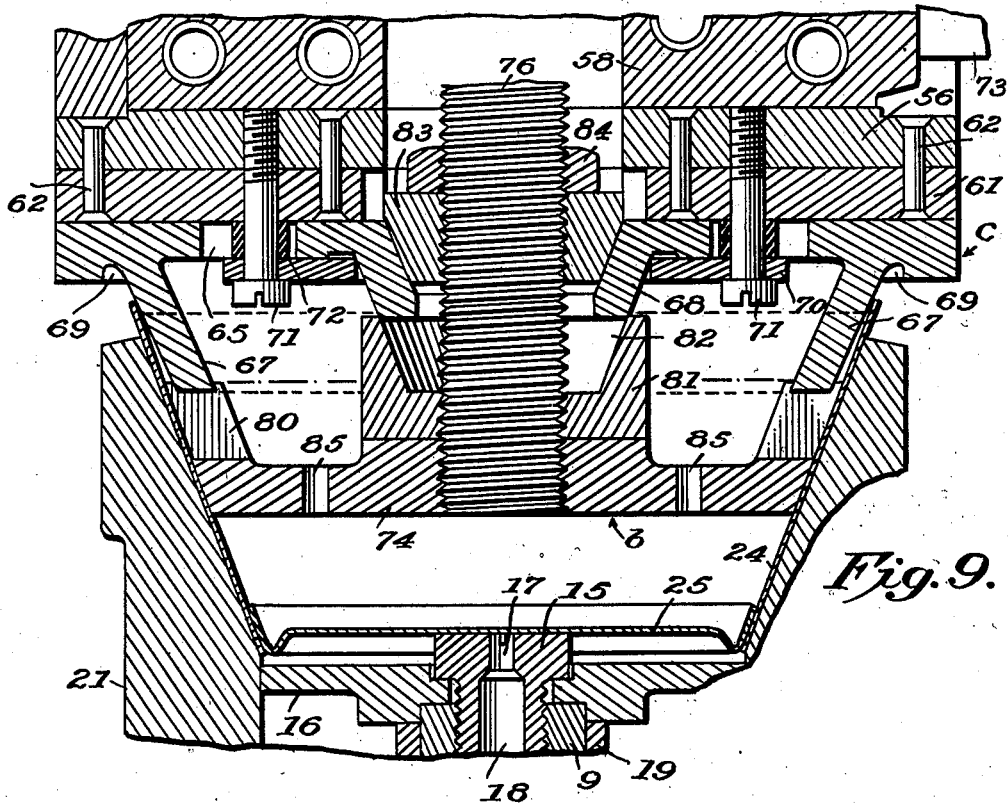
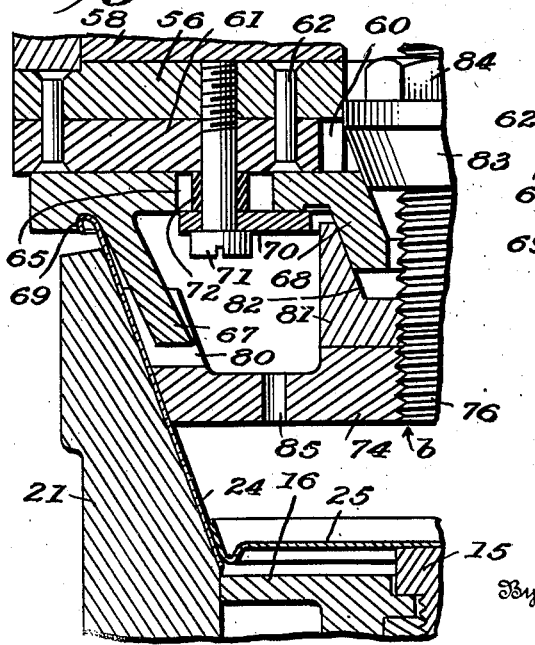
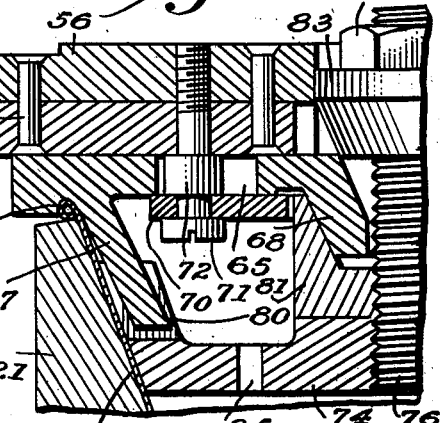
Inventor
Erik G. Seastrom
By Milans & Milans
Attorneys Patented Oct. 8, 1935

2,017,018

UNITED STATES PATENT OFFICE 2,017,018

EDGE CURLING DEVICE

Erik Gunnar Seastrom, Easton, Pa., assignor to Individual Drinking Cup Company, Inc., Easton, Pa., a corporation of Pennsylvania Application October 23, 1934, Serial No. 749,672

18 Claims. (Cl. 93—36)

My invention relates to new and useful improvements in a device for curling the edge of a receptacle or container and more particularly the edge of a paper container or receptacle such as a sundae dish or the like and has for its principal object the provision of a device of the character described which is relatively simple in construction and operation and while in the drawings I have shown it as manually operated it will be understood that, if desired, it might be mechanically operated in suitable manner.

Another object of the invention resides in the provision of a device of the character described including a support or holder for the receptacle or container, the edge of which is to be curled, a clamp adapted to engage interiorly of the receptacle or container for clamping the same in the support or holder while the edge is being curled, a vertically movable member carrying segmental curling irons, and means for heating the irons whereby the curl is set.

A further object of the invention consists in supporting the segmental curling irons so that they may be slid radially to follow the angle of the wall of the container or receptacle, means being provided to positively slide the segmental curling irons in opposite directions as the supporting or carrying member therefor is moved upwardly or downwardly.

A still further object of the invention resides in the provision of novel means for ejecting the container or receptacle from its holder or support, after its edge has been curled, said ejecting means being operated as the member or support carrying the curling irons is moved into its normal raised position.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a side elevation with parts broken away.

Fig. 2 is a front elevation with parts broken away.

Fig. 3 is a vertical section on the line 3—3 of Fig. 1.

Fig. 4 is a vertical section on the line 4—4 of Fig. 1.

Fig. 5 is a detail showing in side elevation the normal relative positions of the clamping member for the receptacle or container and the curling irons.

Fig. 6 is a horizontal section, with parts removed, showing a bottom plan of the curling irons and guides therefor.

Fig. 7 is a top plan of the clamping member.

Fig. 8 is an edge view of the member shown in Fig. 7.

Fig. 9 is a detail, in vertical section, showing the clamping member in engagement with the receptacle or container with the curling irons raised and not in engagement with the edge of the container or receptacle.

Fig. 10 is a detail showing in vertical section, and partly in elevation, the clamping member in engagement with the receptacle or container and the curling irons in engagement with the edge of the receptacle or container to make the initial curl.

Fig. 11 is a view similar to Fig. 10 showing the curling irons in their final positions and the edge of the container or receptacle curled.

Fig. 12 is a top plan of one of the curling irons; and

Fig. 13 is a front elevation of the curling iron shown in Fig. 12.

In the drawings 1 indicates a table, bench, or other suitable support, having adjacent what may be termed its forward edge, a rearwardly extending elongated opening 2 over which is positioned and secured, in any desired manner, an elongated base plate 3 having adjacent its rear end an upwardly directed sleeve or socket 4 in which is positioned and supported the lower end of an upwardly extending post or standard 5. Adjacent its forward end the base 3 is provided, in its upper face, with a recess or depression 6 and extending from the lower surface is a depending sleeve 7 with an opening 8 extending through the base plate and sleeve and in which is operable a rod 9 provided at its lower end with the enlarged head or flange 10 on the upper surface of which is engaged and supported an end of a coiled spring 11, the opposite end of the coiled spring engaging the under surface of the base plate 3 and surrounding the depending sleeve 7. The rod 9 is provided with the longitudinally extending opening 12 terminating adjacent its upper end in an enlarged opening 13 which is interiorly threaded as shown at 14 to receive the screw 15 which secures to the upper end of the rod a plate 16 or head which may be termed an ejector plate for a purpose to be later described. The screw 15 is provided with a restricted opening 17 at its upper surface which communicates with an enlarged opening 18 which extends through the shank of the screw as shown more particularly in Fig. 4 of the drawings. Surrounding the rod 9 between the upper surface of the base plate 3 and the lower surface of the plate or head 16 is a sleeve 19 which limits the downward movement of the rod 9, under action of the coil spring 11 by contact of the lower surface of the plate or head 16 with the upper end of the sleeve 19, as shown more particularly in Fig. 4 of the drawings.

Secured to the base plate 3, by means of the screws 20 or other suitable fastenings, with its lower end received in the recess of the base plate 3, is a cylindrical member 21 forming a holder or support for the container or receptacle to be curled as well as a cylinder in which operates the plate or head 16 carried by the rod 9. At its upper end the inner wall of the cylindrical member 21 is downwardly and inwardly beveled or inclined as shown at 22 and below this beveled or inclined surface the inner wall of the member 21 is straight as shown at 23 to provide the cylinder for the head or plate 16 carried by the rod 9. The inclined or beveled surface 22 forms a seat for the receptacle or container to be curled and such a receptacle or container is shown in position in Figs. 9, 10 and 11 of the drawings, this receptacle or container including an inclined side wall 24 and bottom 25, the receptacle or container when in position having its side wall 24 in contact with the beveled or inclined surface 22 with its bottom 25 in engagement with the upper surface of the screw 15, as shown more particularly in Fig. 9 of the drawings. An air trap is prevented as a receptacle or container is dropped into the upper end of the cylindrical member 21 as the air will pass through the restricted opening 17 and the opening 18 in the screw 15 and then out through the openings 13 and 12 formed in the rod 9. This permits the receptacle or container to be properly seated with its side wall 24 in close contact with the beveled surface 22 and its bottom in supporting contact with the upper surface of the screw 15.

Adjustably connected to the post or standard 5, by means of the set screw 26 or other suitable fastening is a collar 27 having the transversely spaced forwardly directed ears or lugs 28 for a purpose which will be later described. Surrounding the post or standard 5, above the collar 27, and with its lower end bearing on the collar is a coiled spring 29.

A vertically slidable carriage is shown at 30 and is provided with the vertically spaced horizontally extending upper and lower arms 31 and 32 each of which is provided with an opening through which the post or standard 5 passes, as shown more particularly in Fig. 1 of the drawings, the arm 32 being positioned on the post or standard beneath the collar 27 while the upper arm 31 is positioned above and engaged by the upper end of the coiled spring 29. This coiled spring 29 normally holds the carriage in its raised position. The carriage is provided with an edge portion 34 which operates between the transversely spaced lugs or projections 28 on the collar 27, these lugs or projections acting as guides and preventing swinging or rotating movement of the carriage on the post or standard 5, it being understood that the carriage is adapted for slidable movement on said post or standard. Depending from the carriage 30 is an arm 35 which passes through an opening 36 formed in the base plate 3 as well as through the opening 2 formed in the support 1. At its lower end the arm 35 is provided with the lateral extension 37 which projects beneath and engages the enlargement or head portion 10 of the rod 9 to normally hold the rod 9 with the head or plate 16 carried thereby in raised position with the spring 11 under tension and the upper surface of the head or enlargement 10 in engagement with the lower end of the depending sleeve 7. The carriage 30 is further provided, adjacent its lower end, with a horizontally extending arm 38 formed with the enlarged outer end 39 which is provided in its under surface with a recess 40 and in its top with a vertically extending opening 41 communicating with the recess 40.

Pivotally connected at 42, to the collar 27 is one end of a link 43, the opposite end of the link being pivotally connected at 44 to what might be termed the inner end of a lever 45 which in turn is pivotally connected at 46, intermediate its ends, to the carriage 30. By the collar 27 being connected to the post or standard 5 it will be seen that as the outer end of the lever 45 is pulled downwardly through means of the pivotal connection 46 the carriage 30 will be moved downwardly on the post or standard 5 against the action of the coiled spring 34.

Carried by and depending from the enlarged end 39 of the horizontal arm 38 is the curling iron support indicated generally at a and the receptacle or container clamp indicated generally at b. The curling iron support a includes a top portion 47, a depending marginal flange 48, an upwardly directed circumferential flange 49, and an upwardly directed hollow shank or sleeve 50 interiorly threaded at its upper end as shown at 51 to receive the exteriorly threaded shank of a cap 52 which connects the curling iron support to the enlarged end 39 of the arm 38. A channel 53 is formed between the upwardly directed circumferential flange 49 and the upwardly directed hollow shank or sleeve 50 to form a seat for the lower end of a coiled spring 54, the coiled spring surrounding the shank or sleeve 50 with its upper end engageable with the top of the recess 40. The upwardly directed circumferential flange 49 slides in the opening in the bottom of the enlarged end 39 and the support a is adapted for sliding movement relative to the arm 38 and enlarged end 39, the coiled spring 54 normally holding the support in its lowermost position. Removably secured to the depending flange 48 by means of the screws 55 or other suitable fastenings is a plate 56 having the central opening 57, the plate supporting within the recess formed by the depending flange 48 a heating unit indicated at 58, this heating unit having a central opening 59 aligned with the opening 57 for a purpose which will be later apparent. On its bottom surface the plate 56 is formed with the circumferentially spaced radially extending grooves 60 in which are received the keys 61 secured to the plate by means of the rivets 62 or other suitable fastenings. As shown more particularly in Fig. 6 of the drawings the grooves 60 extend from the outer marginal edge of the plate to the center opening 57. Around the outer marginal edge of the plate 56, between the grooves 60, are the depending flange portions 63 while around the inner marginal edge of the plate and between the grooves 60, are the depending flange portions 64, these flange portions 63 and 64 with the keys 61 providing recesses to receive projecting portions of curling irons to be later described. It will be noted by reference to the drawings that the grooves 60 are of greater depth than the height of the flange portions 63 and 64 and that the keys 61 received in the grooves 60 have their lower surfaces flush with the lower surfaces or the lower edges of the flange portions 63, as shown more particularly in Fig. 5 of the drawings.

The curling irons are segmental in form and one of the segments c is shown in detail in Figs. 12 and 13 of the drawings. Each of the segments is provided with an elongated opening 65 positioned at the bottom and intermediate the ends of an elongated groove 66 formed in the upper surface of the segment, the grooves 66 of the segments receiving the keys 61 and permitting sliding movement of the segments relative to the curling iron support and more particularly the plate 56 thereof. Adjacent the forward edge or the wider portion each of the segments is provided with the downwardly extending inwardly inclined teeth 67 while at the rear end or narrow end each of the segments is provided with the downwardly extending inwardly inclined projection 68 for a purpose which will be later brought out. In its under surface, each of the segments is provided with a curling groove 69 which receives the edge of the container or receptacle and curls the same as shown more particularly in Figs. 10 and 11 of the drawings as the curling iron support is lowered. The segments are secured to the plate 56 by means of the ring 70 and screws 71, the ring engaging the under surfaces of the segments while the screws pass through bushings 72 received in the elongated opening 65 and through the keys 61 with their threaded ends engaged in threaded openings in the plate 56. This arrangement is quite clearly shown in Figs. 9, 10 and 11 of the drawings. At 73 I have illustrated a lead in to the heating unit 58. It will be understood that the ring 70 does not so tightly engage the segments as would prevent sliding movement thereof but instead the segments are adapted for sliding movement in a manner which will be presently brought out.

The receptacle or container clamp b includes a plate 74 having the central threaded opening 75 to receive the threaded end of the rod 76 which is provided, adjacent its upper end, with an elongated opening 77 to receive a transversely extending pin 78 which in turn is connected to the upwardly extending shank or sleeve 50 of the curling iron support a. One end of a coiled spring 79 bears against the upper end of the rod 76 with its upper end received in the shank portion of the cap 52 and bearing against the cap. This coiled spring 79 normally forces the rod 76 downwardly so that the pin 78 engages the upper end of the elongated opening 77. Formed around the outer marginal edge of the plate 74 are the upwardly directed outwardly inclined teeth 80 which mesh with, or in other words are received between the downwardly and inwardly directed teeth 67 of the curling iron segments. Received on the threads of the rod 76, and engaging the upper surface of the plate 74 is a socket member 81, the inner wall of which is downwardly and inwardly tapered as shown at 82 and adapted to receive the downwardly extending projections 68 of the curling iron segments c as shown more particularly in Figs. 3, 9, 10 and 11 of the drawings. Also received on the threads of the rod 76, and in spaced relation to the socket member 82, is a wedge member 83 held in position by the lock nut 84. This wedge member 83 is adapted to engage the outer inclined faces of the downwardly extending projections 68 of the curling iron segments c and to slide the same outwardly and to hold them in their normal outward position. When the clamp b is held stationary, in a manner and for a purpose to be later described, and the curling iron support continues its downward movement the socket member 81 receiving the downwardly extending projections 68 of the curling iron segments c will draw the segments inwardly, as shown more particularly in Figs. 10 and 11 of the drawings. Perforations 85 are formed in the plate 74 of the clamp b to permit air to pass through the plate as the clamp is lowered into engaging position with the receptacle or container to be curled.

From the above it is thought that the detailed construction will be clearly understood and I will now endeavor to more in detail bring out the operation. Normally the parts are in the positions shown in Figs. 1 and 2 of the drawings the coiled spring 29 holding the carriage 30 with its associated parts in raised position with the lateral extension 37 of the depending arm 35 holding the rod 9 and its associated head or plate in raised position against the action of the coiled spring 11. The receptacle or container of which the edge is to be curled is placed in the holder or support 21 with the side wall thereof in engagement with the beveled or inclined surface 22 and its bottom in contact with the screw 15 carried by the rod 9 and which connects the head or plate 16 to the rod. With the receptacle or container in such position the operator grasps the lever 45 and draws the same downwardly. Through means of the pivotal connection 46 the carriage 30 is lowered against the action of the coiled spring 29 and by downward movement of the carriage lowers the lateral extension 37 and releases the same from the enlargement or flange 10 of the rod 9 and the coiled spring 11 thereby forces the rod and its associated head or plate 16 downwardly and in turn allows the container or receptacle to further enter the mouth of the holder or support 21. Further lowering of the carriage 30 brings the clamp member indicated at b in engagement with the inner surface of the side wall 24 of the receptacle or container and thereby securely clamps or holds the receptacle or container in the holder or support 21. As the receptacle or container is placed in the holder or support air therebeneath will pass out through the openings 17 and 18 of the screw 15 and through the passages 13 and 12 of the rod 9 thereby preventing an air trap which would prevent proper seating of the receptacle or container within the holder or support. At the same time air which might be trapped in the receptacle or container as the clamping member is lowered will pass through the openings 85 formed in the plate 74 of the clamp. With the clamp in tight engagement with the receptacle or container, as shown more particularly in Fig. 9 of the drawings, a further lowering of the carriage 30 will cause movement of the curling iron support a independent of the clamp b. Normally the coiled spring 79 holds the rod 76 in lowered position with the wedge member 83 engaging the downwardly directed projection 68 of the curling irons c and forces the curling irons outwardly and holds them in the position shown more particularly in Figs. 3 and 9 of the drawings. As the curling iron support a is lowered relative to the clamping member b the downwardly directed extension 68 of the curling iron c will ride into the socket member 81 and due to the incline of said extension 68 and the incline or bevel 82 of the socket member 81 will draw the curling irons or segments c inwardly so that as the curling iron support, with the curling irons or segments is lowered the teeth 67 will follow the angle of the wall of the container or receptacle and the incline bevel 22 of the support or holder 21. As the curling iron support is lowered as thus described the upper edge of the container or receptacle will follow the angle of the downwardly projecting teeth 67 and ride into the grooves 69 of the irons or segments c and receive an initial curl as shown in Fig. 10 of the drawings. A further downward movement will slide or draw the curling irons or segments c inwardly to a greater distance and give the edge of the receptacle or container a final curl as shown more particularly in Fig. 11 of the drawings. After the clamping member b has engaged the receptacle or container to clamp the same in the holder and the curling iron support is lowered relative thereto the downwardly and inwardly directed extension 68 will move away from the wedge member 83 thereby permitting the irons or segments c to be drawn or slid inwardly, as previously described, it being understood that the clamping member b being held stationary the wedge member 83 will in turn be held in a stationary position due to the fact that it is carried by the rod 76 which is connected to the clamping member b. After the edge of the receptacle or container has been curled the lever 45 may be released and the coiled spring 29 will raise the carrier 30 to its original or normal position and as the carriage is raised the curling iron support a will initially have an upward movement independent of the clamping member b and the downwardly and inwardly directed extension 68 will again come into operative engagement with the wedge member 83 which will force or slide them outwardly into their original position shown more particularly in Figs. 3 and 9 of the drawings. After this engagement of the extensions 68 with the wedge member 83 then the clamping member b will be raised with the curling iron support a, as a unit therewith, and assume its original position shown more particularly in Figs. 1 and 2 of the drawings. It will be understood that the curling irons or segments c will slide on the keys 61 said keys acting as guides to maintain the irons or segments in their proper positions for operation. The heating unit 58 acts to heat the curling irons and aids in setting the curl.

From the above it will be seen that I have provided a relatively simple construction adapted to be easily manually operated but, as previously stated, the operation may be mechanical if desired. The clamping member b is connected to the curling iron support to be operated as a unit therewith and simply by operation of the lever 45, or other mechanical means, the carriage will be lowered to initially bring the clamping member into engagement with the wall of the receptacle or container previously positioned in the holder or support and then bring the curling irons into engagement with the edge of the receptacle to curl the same as has been set forth. As the carriage 30 is raised into its initial position the lateral extension 37 will engage the enlarged head or flange 10 on the rod 9 and raise the same against the action of the coiled spring 11 and as the rod is raised it will carry with it the head or plate 16 and such raising movement will raise and loosen the receptacle or container from the holder or support to permit its ready removal therefrom. The coiled spring 54 acts to normally hold the support a in lowered position relative to the enlargement 39 and arm 38 and also acts as a safety device to permit a limited downward movement of the carriage 30 after the curling irons have reached their final movement or positions as shown in Fig. 11. It will be appreciated that if such limited or yielding movement was not permitted there would be a possibility of breaking parts if the lever 45 was further operated after the parts had reached the positions shown in Fig. 11.

Having fully described my invention what I claim as new and desire to secure by Letters Patent is:—

1. A device of the character described for curling the edge of a container including a support for the container, a plunger operable in the support, a vertically slidable carriage, means for holding the carriage normally in raised position, means for lowering the carriage, means supported by the carriage and adapted to be engaged with the edge of the container for curling the same, and means forming a part of the carriage adapted to be engaged with the plunger for operating the plunger to raise the container relative to its support.

2. A device for curling the edge of a container including a supporting member and curling irons carried by the supporting member and adapted to be engaged with the edge of the container, said irons being movable laterally relative to the supporting member.

3. A device for curling the edge of a container including a supporting member and laterally slidable curling irons carried by the supporting member and adapted to be engaged with the edge of the container.

4. A device for curling the edge of a container including a supporting member movable relative to the container, and curling irons carried by the supporting member and adapted to be engaged with the edge of the container, said curling irons being slidable transversely relative to the edge of the container.

5. A device for curling the edge of a container having a tapered wall including a supporting member movable vertically relative to the container, curling irons carried by the supporting member and adapted to be engaged with the edge of the container, and means for drawing the curling irons inwardly as the supporting member is moved towards the container.

6. A device for curling the edge of a container having a tapered wall including a supporting member movable vertically relative to the container, curling irons adapted to be engaged with the edge of the container and having a downwardly and inwardly directed portion, and means for sliding the curling irons transversely relative to the edge of the container to permit the downwardly and inwardly directed portions thereof to remain parallel with the tapered wall of the container as the supporting member is moved relative thereto.

7. A device for curling the edge of a container including a supporting member movable relative to the container, segmental shaped curling irons carried by the supporting member, and means controlled by the movement of the supporting member for sliding the curling irons transversely relative to the edge of the container.

8. A device of the character described for curling the edge of a container including a support for the container, a clamping member adapted to be moved into engagement with the container for clamping the same in the support, a curling iron support operable with the clamping member for a portion of its movement, means permitting continued movement of the curling iron support after the clamping member is in clamping engagement, and curling irons adapted to be engaged with the edge of the container, said curling irons being slidable transversely relative to the edge of the container.

9. A device of the character described for curling the edge of a container including a support for the container, a clamping member adapted to be moved into engagement with the container for clamping the same in the support, a curling iron support operable with the clamping member for a portion of its movement, curling irons carried by the support, means permitting continued movement of the curling iron support after the clamping member is in clamping engagement, and means for sliding the curling irons inwardly transversely of the edge of the container as the movement of the curling iron support is continued relative to the clamping member.

10. A device of the character described for curling the edge of a container including a support for the container, a clamping member adapted to be moved into engagement with the container for clamping the same in the support, a curling iron support initially movable with the clamping member towards the edge of the container, means permitting continued movement of the curling iron support relative to the clamping member after the clamping member has reached its clamping position, curling irons carried by the curling iron support, means for sliding the curling irons inwardly transversely of the edge of the container as the support continues its movement relative to the clamping member, and means for moving the curling irons outwardly transversely of the edge of the container as the curling iron support is raised and the clamping member is disengaged from the container.

11. A device of the character described for curling the edge of a container including a support for the container, a clamping member adapted to be moved into engagement with the container for clamping the same in the support, a curling iron support initially movable with the clamping member towards the edge of the container, means permitting continued movement of the curling iron support relative to the clamping member after the clamping member has reached its clamping position, curling irons carried by the curling iron support, each of said curling irons having a projection extending downwardly at an angle therefrom, means engageable with the projections for sliding the curling irons inwardly transversely of the edge of the container as the curling iron support continues its movement relative to the clamping member, and means engageable with the projections for sliding the curling irons outwardly transversely of the edge of the container as the curling iron support and clamping member are raised to their normal position.

12. A device of the character described for curling the edge of a container including a support for the container, curling irons, and means for simultaneously moving the curling irons downwardly and transversely with respect to the edge of the container.

13. A device of the character described for curling the edge of a container including a support for the container, curling irons, and means for simultaneously moving the curling irons vertically and transversely with respect to the edge of the container.

14. A device of the character described for curling the edge of a container including a support for the container, curling irons, and means for simultaneously moving the curling irons downwardly and transversely inwardly relative to the edge of the container.

15. A device of the character described for curling the edge of a container including a support for the container, curling irons, and means for simultaneously moving the curling irons upwardly and transversely outward relative to the edge of the container.

16. A device of the character described for curling the edge of a container including a support for the container, curling irons, and means for simultaneously moving the curling iron downwardly and transversely inward and upwardly and transversely outward relative to the edge of the container.

17. A device of the character described for curling the edge of a container including a support for the container, a clamping member adapted to be moved into engagement with the container for clamping the same to the support, a curling iron support initially movable with the clamping member towards the edge of the container, means permitting continued movement of the curling iron support relative to the clamping member after the clamping member has reached its clamping position, curling irons carried by the curling iron support, each of said curling irons having a projection extending downwardly at an angle therefrom, a tapered cup-like member engageable with the projections for sliding the curling irons inwardly transversely of the edge of the container as the curling iron support continues its movement relative to the clamping member, and a wedge member engageable with the projections for sliding the curling irons outwardly transversely of the edge of the container as the curling iron support and clamping member are raised to their normal position.

18. A device of the character described for curling the edge of a container including a support for the container, a plunger operable in the support, a vertically slidable carriage, means for holding the carriage normally in raised position, means for lowering the carriage, means supported by the carriage and adapted to be engaged with the edge of the container for curling the same, and a lateral extension on the carriage adapted to be engaged with the plunger for operating the plunger to raise the container relative to its support.

ERIK GUNNAR SEASTROM.